No. 760,545. PATENTED MAY 24, 1904.
R. J. MILLER.
DISTANCE MEASURING INSTRUMENT.
APPLICATION FILED OCT. 15, 1903.
NO MODEL.

Witnesses:
Geo. W. Young
G. G. Stahl

Inventor:
Robert J. Miller.

By Herbert J. Piper
Attorney.

No. 760,545.  
Patented May 24, 1904.

UNITED STATES PATENT OFFICE.

ROBERT J. MILLER, OF MILWAUKEE, WISCONSIN.

DISTANCE-MEASURING INSTRUMENT.

SPECIFICATION forming part of Letters Patent No. 760,545, dated May 24, 1904.

Application filed October 15, 1903. Serial No. 177,119. (No model.)

*To all whom it may concern:*

Be it known that I, ROBERT J. MILLER, a citizen of the United States, and a resident of Milwaukee, in the county of Milwaukee and State of Wisconsin, have invented certain new and useful Improvements in Distance-Measuring Instruments; and I do hereby declare that the following is a full, clear, and exact description thereof.

My invention has for its object to provide a simple and accurate instrument for measuring unknown distances.

It consists in certain peculiarities of construction and combination of parts to be fully set forth hereinafter, with reference to the accompanying drawings, and subsequently claimed.

Figure 1:
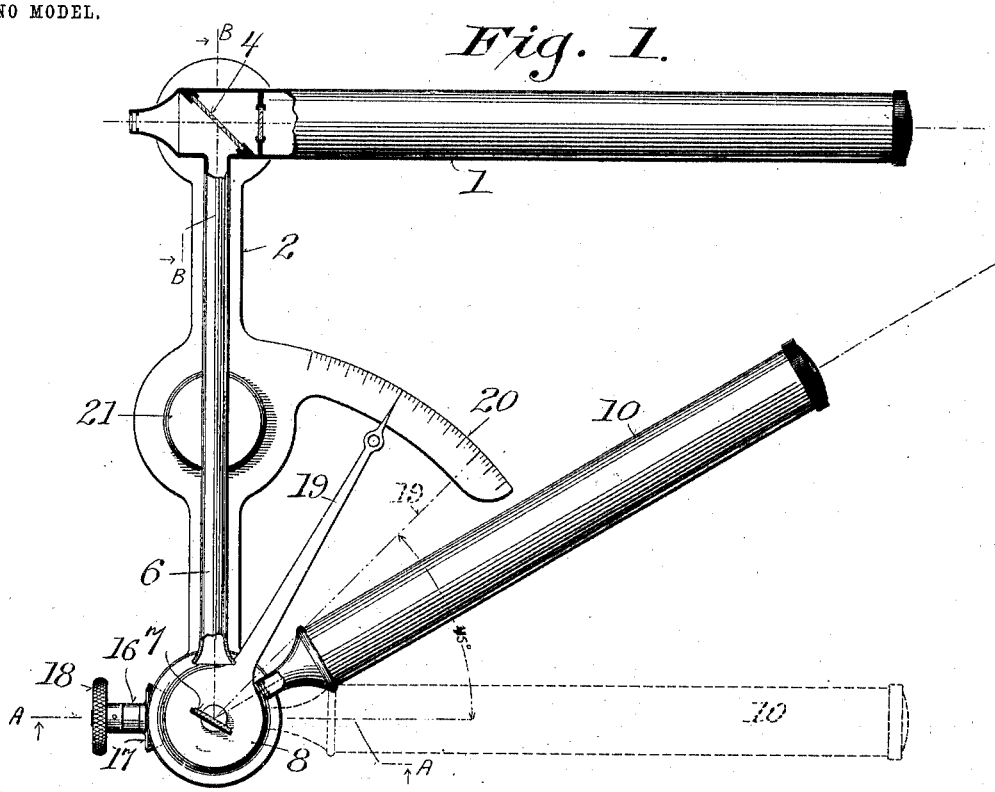
Figure 2:
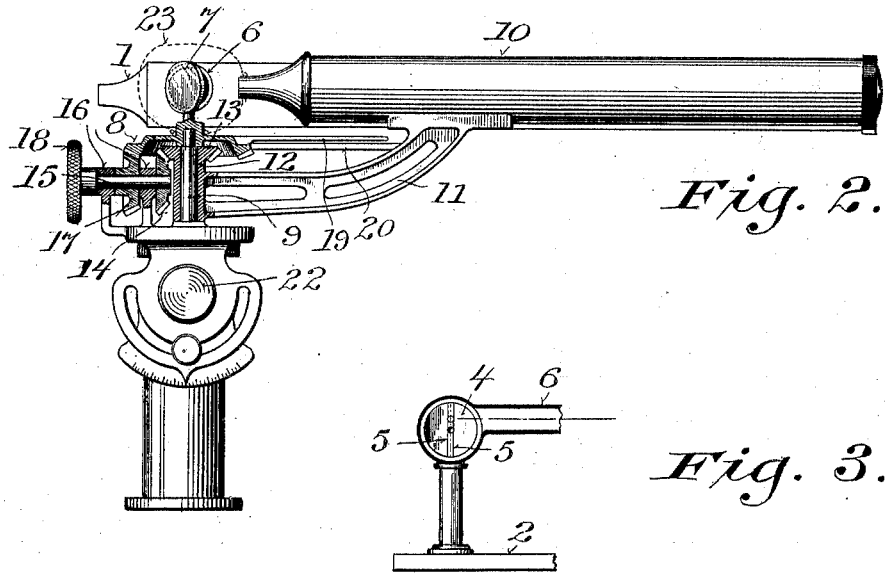
Figure 3:
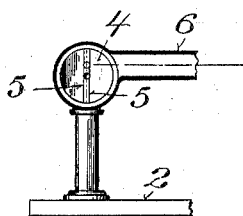

In the drawings, Figure 1 is a plan view of my improved device. Fig. 2 is an elevation of the same, partly in section, on the line A A of Fig. 1. Fig. 3 is a detailed cross-section on the line B B of Fig. 1.

My device in its preferred form, as shown in the accompanying drawings, consists of a pair of telescopes or sighting instruments mounted upon a suitable bed-plate in such manner that one of said instruments may be adjusted in position with relation to the other, together with certain accessories hereinafter specifically named and means for changing the position of said bed-plate with relation to the central base on which it is supported, as well as means for moving one of said instruments and its said accessories as required.

Referring by numerals to the drawings, 1 designates the primary telescope, which is secured to the movable bed-plate 2 at an angle of ninety degrees and is provided with the usual lenses and with a reflector 4, the latter being disposed within the barrel of the telescope at an angle of forty-five degrees adjacent to the eyepiece. This reflector is provided with a central opening, through which the object is sighted and, also has two vertical lines 5 5 marked upon either side thereof. A tube 6 extends at right angle to the aforesaid telescope, but slightly above the center of the same, its axis intersecting the vertical axis of the reflector, as best shown in Fig. 3 of the drawings. This tube is open at the other end and terminates adjacent to a pivotally-adjustable reflector 7, which is centrally mounted upon a bevel-gear 8, the latter being free to turn upon a post 9, which projects from the bed-plate 2. A second telescope 10 is pivotally secured to the bed-plate 2 upon the same axial plane as the tube 6 by means of a bracket 11, which terminates in a hub 12, fitted loosely upon the post 9 directly beneath the gear 8. This hub is formed with a bevel-gear 13, half the size of the gear 8, and is in mesh with a miter-gear 14, fast upon a shaft 15, which shaft has its bearings in brackets 16, projecting from the bed-plate 2, and the outer end of this shaft has secured thereto a hand-wheel 18. Another gear 17, of same diameter as gear 14, is also fast to this shaft and meshes with the reflector-gear 8. Projecting from the said gear 8 is a pointer 19, which is adapted to move over a segmental scale 20, that extends from the bed-plate 2, at about the center thereof, the said bed-plate being capable of vertical and horizontal adjustments by means of a central vertical pivot 21 and horizontal pivot 22, which are connected to the central supporting-base 3, as shown.

Having described the parts of my device in detail, the distance of the object desired is determined as follows: The object is sighted through the primary telescope 1, which is moved horizontally and vertically with its bed-plate 2, and as the telescope 10 is also mounted on said bed-plate it will move with the latter. Now when the object is seen directly in the central opening of the reflector 4 the operator holds the instrument at this point and then turns the hand-wheel 18, which, through its gears, slowly moves the telescope 10 from a position which was normally parallel to the telescope 1 toward the latter until it comes within the range of the object upon the reflector 7. Said reflector in the meantime, by reason of its gear connection, has also moved from its normal position of forty-five degrees with relation to the telescope 10 and tube 6 to a position the angle of which is equal to one-half the distance between the telescope 10 and tube 6, thus traveling only one-half as fast as said telescope, and thereby automatically preserving the proper angle for projecting the image through the tube and upon the reflector 4 of telescope 1. The object of the image is then seen in duplicate one above the other, and if their vertical alinement is perfect with relation to the guide-lines 5 5 the operator knows his angles are correct, and he then looks at the pointer 19, which indicates on the scale 20 the exact distance sought to be measured.

While I have shown and described a simple means for carrying out my invention, it is obvious that without departing from the spirit thereof I may vary the mechanical arrangements for adjusting the telescopes or sighting instruments and by a multiplication of gears, &c., increase the travel of the distance indicator or pointer so as to magnify the scale to any desired degree.

As indicated by dotted lines in Fig. 2 of the drawings, a hood or shield may be used to envelop the reflector, tube-opening, and the end of the telescope 10, so as to protect the rays of reflection.

Having thus described my invention, what I claim as new, and desire to secure by Letters Patent, is—

1. In a distance-measuring instrument, a telescope or sighting instrument having a fixed reflector at an angle of forty-five degrees with relation to its line of sight, said reflector being provided with a central opening; and a second telescope or sighting instrument, pivoted at a predetermined distance from the first-named telescope or sighting instrument, but upon a different horizontal plane; a revoluble reflector located upon the pivot of said telescope or sighting instrument and in the line of sight thereof and means whereby the angle of the aforesaid reflector is automatically varied with relation to the angle formed by the telescope or sighting instrument whereby an object observed through the first-named telescope or sighting instrument is imaged upon its fixed reflector when the second telescope or sighting instrument is properly adjusted, substantially as set forth.

2. In a distance-measuring instrument a pair of telescopes or sighting instruments located on planes of different elevation at a predetermined distance apart, one of said instruments being fixed and the other on a pivot to be adjustable to various angles, a rotary adjustable reflector mounted upon said pivot, gear mechanism connecting said reflector and pivotal telescope or sighting instrument, and a centrally-apertured reflector fast in the fixed telescope or sighting instrument, whereby an object may be observed through the fixed instrument and imaged on the reflector therein when the pivotal telescope or sighting instrument is properly adjusted, substantially as set forth.

In testimony that I claim the foregoing I have hereunto set my hand, at Milwaukee, in the county of Milwaukee and State of Wisconsin, in the presence of two witnesses.

ROBERT J. MILLER.

Witnesses:
HERBERT J. PIPER,
MARGARET MALLOY.